Sept. 8, 1970   S. H. GOWARD ET AL   3,527,485
RELEASABLE PIPE COUPLING

Filed July 26, 1968   2 Sheets-Sheet 1

Inventors
Stanley Harold Goward
Michael Robert Goddard

Watson, Cole, Grindle & Watson
Attorneys

Sept. 8, 1970   S. H. GOWARD ET AL   3,527,485
RELEASABLE PIPE COUPLING

Filed July 26, 1968   2 Sheets-Sheet 2

Inventors
Stanley Harold Goward
Michael Robert Goddard
Watson, Cole, Grindle & Watson
Attorneys United States Patent Office 3,527,485
Patented Sept. 8, 1970

3,527,485
RELEASABLE PIPE COUPLING
Stanley Harold Goward and Michael Robert Goddard, London, England, assignors to BTR Industries Limited, London, England, a British company
Filed July 26, 1968, Ser. No. 748,035
Int. Cl. F16l *37/14*
U.S. Cl. 285—305          3 Claims

ABSTRACT OF THE DISCLOSURE

A releasable spigot and socket type pipe coupling having co-operating grooves on the spigot and socket members and a U-shaped member which co-operates with the groove through holes in the socket member in which coupling the holes are of frusto-conical form and the U-shaped member is provided with a saw-toothed abutment which engages the holes to prevent accidental dislodgement of the U-shaped member.

---

Such couplings are intended primarily for use in coal mines where they are used under extremely difficult conditions. Various types of coupling have been proposed and, in particular, such are known to include a releasable pipe coupling of the kind comprising interfitting co-axial cylindrical spigot and socket members in which the two members have, respectively, an external and an internal circumferential groove which register one with the other when the spigot is within the socket and in which there are four holes spaced at 90° intervals around the socket member which holes are radial in relation to the two members and break into the groove in the socket member, and a removable locking device comprising a U-shaped member the arms of which are insertable through any two adjacent holes in the socket member to extend chordwise of the spigot and socket members into the registering grooves on opposite sides, respectively, of the axis of the members.

Such couplings suffer from the disadvantage that the U-shaped member may fall out of the socket member, particularly, if the U-shaped member has to be inserted from below the socket member. It is an object of the invention to provide a simple and effective coupling where accidental removal of the U-shaped member cannot occur and which is simple to machine.

Accordingly, the invention requires that each of the radial holes be frusto-conical with its larger diameter outermost on the socket member, the angle at the apex of each hole being at least 90° and there being, adjacent the free end of one of the arms of the U-shaped member, an outwardly facing abutment engageable with the side wall of one of the radial holes in the socket member to prevent accidental removal of the U-shaped member, the arms of the U-shaped member being resiliently deflectable towards one another to allow engagement and disengagement of the abutment means with the side wall of the hole.

Figure 1:
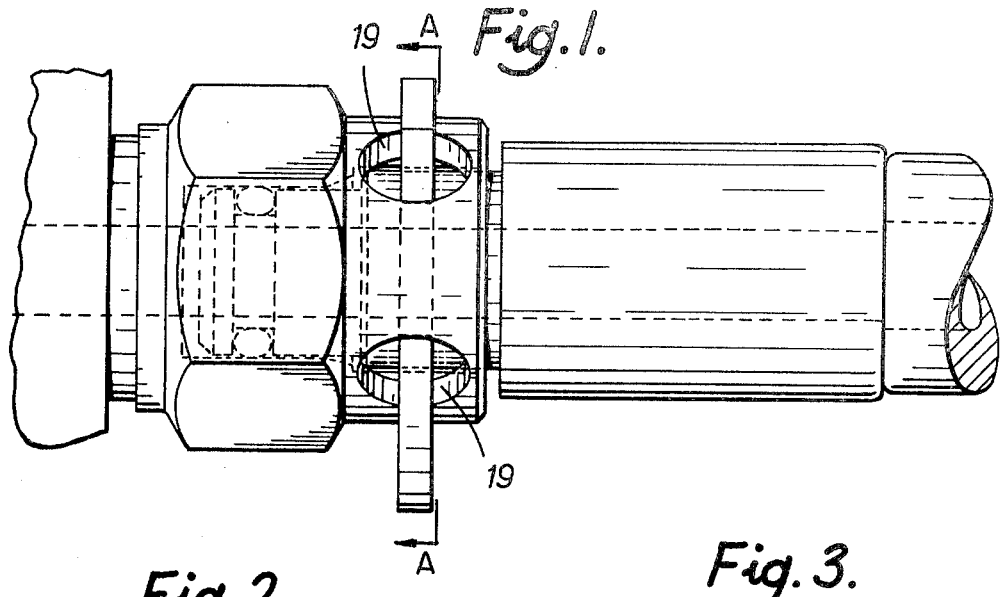
Figure 2:
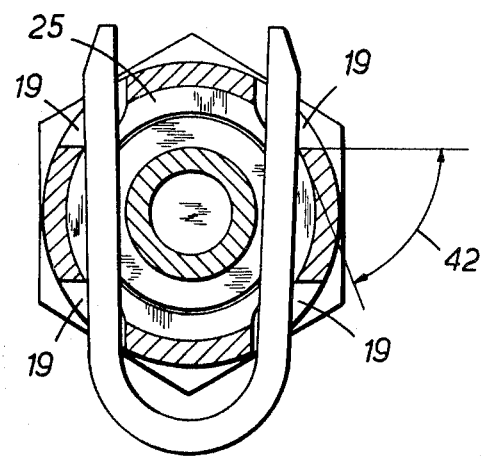
Figure 3:
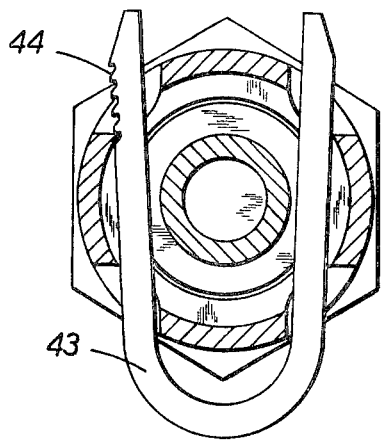
Figure 4:
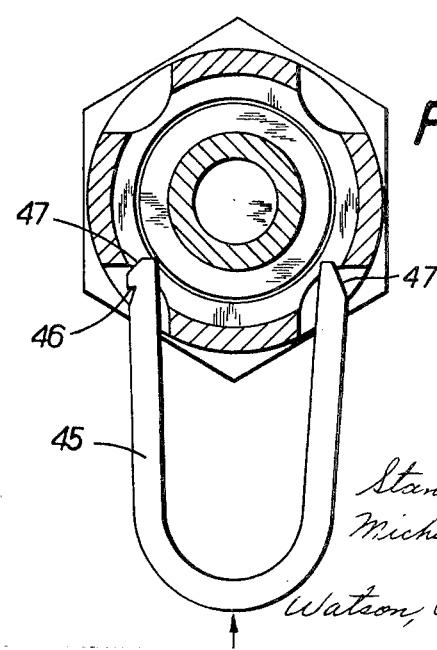
Figure 5:
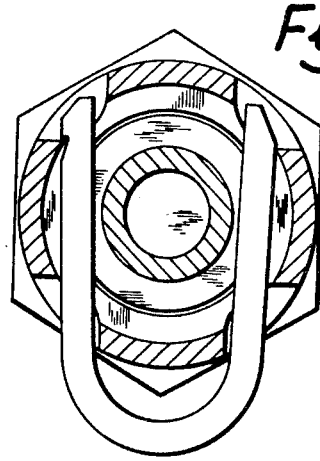
Figure 6:
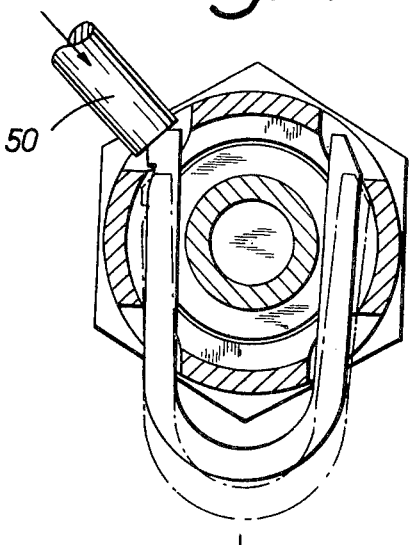
Figure 7:
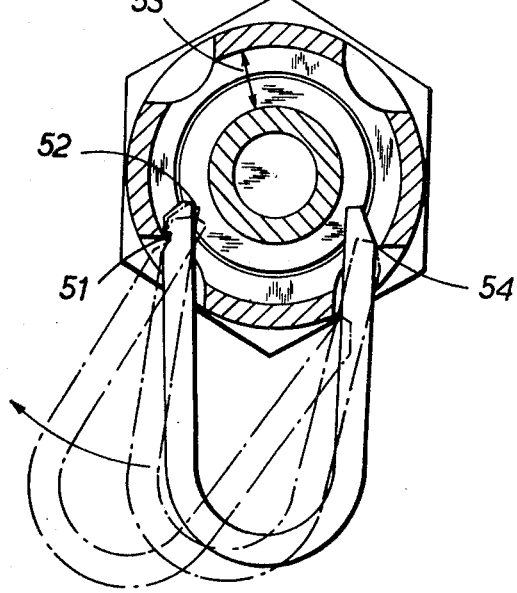

A specific example of a releasable pipe coupling according to the invention will now be described with reference to the accompanying drawings, in which:

FIG. 1 is a side view of the assembled coupling;
FIG. 2 is a section on the line A—A in FIG. 1;
FIG. 3 is the same section as FIG. 2 showing an alternative U-shaped member or staple;
FIG. 4 is the same section as FIG. 2 showing yet another alternative staple with the staple ready for insertion;
FIG. 5 shows the staple of FIG. 4 in its inserted position;
FIG. 6 shows how the staple of FIGS. 4 and 5 may be released; and
FIG. 7 shows the final stage in the removal of the staple of FIGS. 4 to 6.

Referring to FIGS. 1 and 2, the releasable pipe coupling comprises a socket member and a spigot member, the cylindrical internal surface of the socket member mating with the cylindrical external surface of the spigot member. The spigot member has a circumferential locking groove which registers with an internal groove in the socket member when the two members are assembled as shown in these figures.

The socket member is provided with four holes 19 drilled radially at 90° intervals and these holes break into the groove of the socket member. The four holes are of such a size that a U-shaped locking clip may be inserted through any two adjacent holes to pass through both the grooves in the socket member and the spigot member to hold the two members together.

An important feature of the invention is that these four holes 19 are each of conical or nearly conical shape with the sides of the holes meeting at the apex of the cone at an angle of 90°.

An advantage of the invention is that the angle 42 formed between the edge of each hole 19 and the base of the groove 25 is much greater and less subject to change when deburred and when suffering repeated passage of the staple than is the case in the earlier specification.

A further advantage of the new form of the holes 19 is illustrated in FIGS. 3 to 7 where the portion of the socket member forming the angle 42 is used as a sear to engage a notched staple.

In FIG. 3 there is shown a staple 43 having five notches 44 in one of its arms. The notches are of serrated form such that movement of the staple in a direction to engage the staple further into its holes is possible while disengagement of the staple is resisted. It will be seen that the staple is so dimensioned that the resilience between the two arms of the staple tends to engage the notches with the sear. The staple can be disengaged by pinching together the two ends of the arms.

FIGS. 4 to 7 illustrate a further staple 45 with a single notch 46. FIG. 4 shows the staple about to be engaged and FIG. 5 shows the staple in the engaged position. It will be noticed that the staple is provided with chamfered ends 47 at the ends of the arms to assist in engagement of the staple as shown in FIG. 4. It will further be seen that the ends of the arms of the staple do not protrude beyond the socket member as shown in FIG. 5. This helps to prevent accidental dislodgement of the staple.

FIGS. 6 and 7 show two steps in the removal of the staple. As shown in FIG. 6 a blunt instrument 50 is used to depress the notched end of the staple. The staple is then moved to the position shown in chained lines in FIG. 6.

The staple is then pulled out to the position shown in FIG. 7 when the notch engages the corner 51. The staple is then withdrawn by means of a rotary movement about the point 51 as indicated by the two chained lines and the arrow 52 in the figure. In order for such rotation to be possible it is essential that the distance between the portion of the notch engaging the corner 51 and the tip 52 of the staple is less than the width 53 of the combined grooves in the spigot and socket members. It is also important that the other limb of the U-shaped staple will slide past the point 54.

We claim:
1. A releasable pipe coupling of the kind comprising interfitting co-axial cylindrical spigot and socket members in which the two members include walls which have, respectively, an internal and an external circumferential groove which register one with the other when the spigot is within the socket and in which walls there are four holes spaced at 90° intervals around the socket member which holes are radial in relation to the two members and break into the groove in the socket member, and a re- movable locking device comprising a U-shaped member the arms of which are insertable through any two adjacent holes in the socket member to extend chordwise of the spigot and socket members into the registering grooves on opposite sides, respectively, of the axis of the members, in which each of the radial holes is frusto-conical with its larger diameter outermost on the socket member and the angle of the apex of each of the radial holes, is at least 90° and there being, adjacent the free end of one of the arms of the U-shaped member, an outwardly facing abutment means which is engageable with the side wall of one of the radial holes in the socket member to prevent accidental removal of the U-shaped member, the arms of the U-shaped member being resiliently deflectable towards one another to allow engagement and disengagement of the abutment means with the side wall of said one of the holes, the distance between the junction of said abutment means on said one arm and the inner terminal edge of the said one arm being less than the combined depth of said two grooves, and said abutment means being located on an outer face of said one arm with the distance between corresponding edges of adjacent holes being less than the distance between said abutment means and the outer face of the U-shaped member other arm, thereby permitting withdrawal of said U-shaped member by pivotal movement thereof when said abutment means is engaged with the inner edge of one hole remote from its fully engaged position.

2. A pipe coupling as claimed in claim 1 in which the abutment means is a single notch.

3. A pipe coupling as claimed in claim 1 in which the outer edges of the free ends of the arms are chamfered to provide a lead-in for the U-shaped member into any of the two adjacent holes in the socket member.

References Cited
UNITED STATES PATENTS

| | | | |
|---|---|---|---|
| 562,491 | 6/1896 | Schoup | 287—53 X |
| 1,300,569 | 4/1919 | Bundy | 287—119 X |

FOREIGN PATENTS

| | | |
|---|---|---|
| 328,178 | 4/1958 | Switzerland. |
| 398,217 | 2/1966 | Switzerland. |

DAVE W. AROLA, Primary Examiner

PO-1050
(5/69)

UNITED STATES PATENT OFFICE
CERTIFICATE OF CORRECTION

Patent No. 3,527,485     Dated September 8, 1970

Inventor(s) GOWARD, Stanley Harold and GODDARD, Michael Robert

It is certified that error appears in the above-identified patent and that said Letters Patent are hereby corrected as shown below:

In the heading, after "Serial No. 748,035," please insert --Claims priority Application Great Britain May 31, 1968, No. 26255/68.--

SIGNED AND SEALED

DEC. 22, 1970

(SEAL)
Attest:

Edward M. Fletcher, Jr.
Attesting Officer

WILLIAM E. SCHUYLER, JR.
Commissioner of Patents